(12) United States Patent
Hegenbart et al.

(10) Patent No.: US 9,751,610 B2
(45) Date of Patent: Sep. 5, 2017

(54) PASSENGER DOOR CORNER COMPONENT AND MANUFACTURING METHOD FOR PASSENGER DOOR CORNER COMPONENT OF AIRCRAFT OR SPACECRAFT

(71) Applicant: Airbus Operations GmbH, Hamburg (DE)

(72) Inventors: Matthias Hegenbart, Ahlerstedt (DE); Wolfgang Eilken, Hamburg (DE)

(73) Assignee: Airbus Operations GmbH (DE)

( * ) Notice: Subject to any disclaimer, the term of this patent is extended or adjusted under 35 U.S.C. 154(b) by 132 days.

(21) Appl. No.: 14/536,824

(22) Filed: Nov. 10, 2014

(65) Prior Publication Data

US 2015/0136908 A1    May 21, 2015

(30) Foreign Application Priority Data

Nov. 21, 2013    (EP) .................................. 13193785

(51) Int. Cl.

| | | |
|---|---|---|
| *B64C 1/14* | (2006.01) | |
| *E06B 3/04* | (2006.01) | |
| *B23K 15/00* | (2006.01) | |
| *B22F 3/105* | (2006.01) | |
| *B22F 5/00* | (2006.01) | |
| *B33Y 10/00* | (2015.01) | |
| *B33Y 80/00* | (2015.01) | |

(52) U.S. Cl.
CPC .......... *B64C 1/1461* (2013.01); *B22F 3/1055* (2013.01); *B22F 5/00* (2013.01); *B23K 15/0086* (2013.01); *B64C 1/1423* (2013.01); *E06B 3/04* (2013.01); *B33Y 10/00* (2014.12); *B33Y 80/00* (2014.12); *Y02P 10/295* (2015.11)

(58) Field of Classification Search
CPC ... B64C 1/1461; B64C 1/1423; B23K 26/342; B23K 15/0086; B22F 3/1055; B22F 3/10; E06B 3/04; B33Y 10/00; B33Y 80/00
See application file for complete search history.

(56) References Cited

U.S. PATENT DOCUMENTS

| | | | |
|---|---|---|---|
| 4,190,996 A | 3/1980 | Schindler et al. | |
| 5,337,977 A * | 8/1994 | Fleming | ................. B64C 1/143 244/129.5 |
| 5,567,509 A | 10/1996 | Gautier | |
| 6,519,500 B1 * | 2/2003 | White | .................... G05B 19/00 156/73.1 |

(Continued)

FOREIGN PATENT DOCUMENTS

| | | |
|---|---|---|
| DE | 10 2009 034 566 A1 | 2/2011 |
| WO | 2013/160188 A1 | 10/2013 |

OTHER PUBLICATIONS

Search Report—EP 13193785.6 dated Apr. 9, 2014.

*Primary Examiner* — Valentina Xavier
(74) *Attorney, Agent, or Firm* — Lerner, David, Littenberg, Krumholz & Mentlik, LLP

(57) ABSTRACT

A manufacturing method for passenger door corner components of aircraft or spacecraft includes using additive layer manufacturing, ALM, to form an integral passenger door corner component. The integral passenger door corner component includes a substantially cruciform shape having a frame coupling member with two frame couplings as end pieces. The frame coupling member intersect with a beam coupling member with two beam couplings as end pieces.

5 Claims, 1 Drawing Sheet

(56) References Cited

U.S. PATENT DOCUMENTS

| | | |
|---|---|---|
| 2010/0320331 A1 | 12/2010 | Vallee |
| 2012/0012712 A1 | 1/2012 | Eden |
| 2013/0287934 A1* | 10/2013 | Ramsundar .............. B05D 1/38 427/9 |
| 2014/0268607 A1* | 9/2014 | Wicker .................. H05K 3/328 361/761 |
| 2014/0314581 A1* | 10/2014 | McBrien .................. F01D 5/28 416/96 R |
| 2015/0108687 A1* | 4/2015 | Snyder ................ B29C 67/0088 264/308 |
| 2015/0298213 A1* | 10/2015 | Beyer .................. B22F 3/1055 419/7 |

* cited by examiner

PASSENGER DOOR CORNER COMPONENT AND MANUFACTURING METHOD FOR PASSENGER DOOR CORNER COMPONENT OF AIRCRAFT OR SPACECRAFT

FIELD OF THE INVENTION

The present invention relates to a passenger door corner component and a manufacturing method for passenger door corner components of aircraft or spacecraft, in particular by using additive layer manufacturing (ALM) and/or additive manufacturing (AM) processes.

BACKGROUND OF THE INVENTION

Additive layer manufacturing (ALM) techniques may be used in procedures for building up three-dimensional solid objects based on digital model data. ALM employs an additive process where layers of material are sequentially built up in different shapes. ALM is currently used for prototyping and distributed manufacturing with multiple applications in engineering, construction, industrial design, automotive industries and aerospace industries.

For example, document DE 10 2009 034 566 A1 discloses a method for manufacturing a fuel tank employing a generative layer manufacturing procedure.

Today, door surroundings of passenger aircraft are realized using a complex assembly of conglomerated individual parts which consist of multiple panels, frames, stringers, skins, doublers, beams, crossbeams, intercostals and similar components. Different parts, for example the longitudinal beams, are recessed to allow the intersection of other parts. Multiple tension bolts, fasteners and rivets are needed to assemble the individual structural members.

Typically, the manufacturing process involves milling or cutting single parts out of a block and assembling the individual members with fastening means to obtain the whole door surrounding structure.

BRIEF SUMMARY OF THE INVENTION

It is one idea of the invention to provide a solution for reducing the manufacturing complexity of a door surrounding.

According to a first aspect of the invention, a manufacturing method for passenger door corner components of aircraft or spacecraft is provided, the method comprising using additive layer manufacturing, ALM, to form an integral passenger door corner component, the integral passenger door corner component comprising a substantially cruciform shape having a frame coupling member with two frame couplings as end pieces, the frame coupling member intersecting with a beam coupling member with two beam couplings as end pieces.

According to a second aspect of the invention, an integral passenger door corner component is provided which is manufactured by a method according to the first aspect of the invention.

An idea on which the present invention is based is to use additive layer manufacturing (ALM) or additive manufacturing (AM) technology when creating a passenger door corner component. This allows for the integration of differentiated multi-part assemblies into a single integral design with multiple functionalities.

Particularly advantageous is the reduction of costs, weight, lead time, part count and manufacturing complexity coming along with employing ALM technology. Moreover, the passenger door corner component may be optimally designed keeping in mind an improved distribution of force flows within the component.

All parts and improvements of the door surrounding, such as crossbeam connections, corner doublers, hinges, hinge beams latch fittings, door sill beams, intercostals, stringers, door stops and similar parts, may be manufactured with ALM as well.

According to an embodiment of the method, ALM may be performed using powder bed technology. Alternatively, ALM may be performed using wire feed technology.

According to a further embodiment of the method, one of the frame couplings and one of the beam couplings may form a door edge. In that embodiment it may be possible for the door edge to include a reinforcement rim.

According to another embodiment of the method, the integral passenger door corner component may comprise a corner doubler in an angle opposite of the door edge. Corner doublers may provide further stabilization of the door surrounding by effectively distributing the force flow away from the joint locations of the frames and longitudinal beams.

BRIEF DESCRIPTION OF THE DRAWINGS

The invention will be explained in greater detail with reference to exemplary embodiments depicted in the drawings as appended.

The accompanying drawings are included to provide a further understanding of the present invention and are incorporated in and constitute a part of this specification. The drawings illustrate the embodiments of the present invention and together with the description serve to explain the principles of the invention. Other embodiments of the present invention and many of the intended advantages of the present invention will be readily appreciated as they become better understood by reference to the following detailed description. The elements of the drawings are not necessarily to scale relative to each other. Like reference numerals designate corresponding similar parts.

Figure 1:
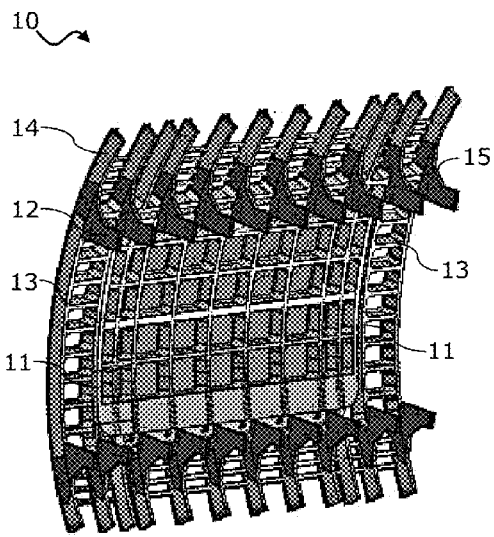
FIG. 1 schematically illustrates a door surrounding of a passenger door in an aircraft.

In the figures, like reference numerals denote like or functionally like components, unless indicated otherwise. Any directional terminology like "top", "bottom", "left", "right", "above", "below", "horizontal", "vertical", "back", "front", and similar terms are merely used for explanatory purposes and are not intended to delimit the embodiments to the specific arrangements as shown in the drawings.

Although specific embodiments have been illustrated and described herein, it will be appreciated by those of ordinary skill in the art that a variety of alternate and/or equivalent implementations may be substituted for the specific embodiments shown and described without departing from the scope of the present invention. Generally, this application is intended to cover any adaptations or variations of the specific embodiments discussed herein.

Free form fabrication (FFF), direct manufacturing (DM) and additive manufacturing (AM) belong to a general hierarchy of layer manufacturing (LM) methods. Those methods are used to form a three-dimensional solid object by sequentially building up layers of material. Any of such procedures will be referred to in the following description as additive layer manufacturing (ALM) without loss of generality. ALM techniques usually include selectively depositing material layer by layer, selectively fusing or solidifying the material and removing excess material, if needed.

DETAILED DESCRIPTION

FIG. 1 shows a schematic illustration of a door surrounding 10 of a passenger door in an aircraft. The door surrounding 10 comprises door frames 11 around the door, additional frames 14 in the vicinity of the door, longitudinal beams 15 running substantially perpendicular to the door frames 11, intercostals 13 between the door frames 11 and the additional frames 14, and crossbeams 12.

On the outer surface, the door surrounding comprises a skin bearing most of the loads such as hoop stress, tension and compression due to fuselage bending and shear stress from fuselage torsion. The frames 11 and 14 are used for orthotropic stiffening of the skin in order to prevent torsional buckling of the skin. It may be possible to provide a number of door stops at each side of the door frames 14 so as to distribute the forces due to pressure to the door frames 14 at both sides of the door cut-out.

The additional frames 11 are implemented with sufficient bending strength to carry the loads on the door stops. The intercostals 13 are short beams located between the door frames 14 and the additional frames 11.

The longitudinal beams 15 formed as upper and lower sill beams of the door, respectively, are implemented upper and lower bending beams in order to carry the fuselage torsion in the vicinity of the door cut-out, acting as tension and compression members in fuselage bending.

Figure 2:
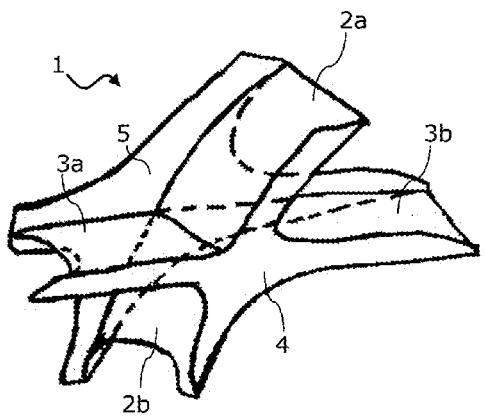
FIG. 2 schematically illustrates a passenger door corner component according to an embodiment of the invention.

FIG. 2 shows a schematic illustration of a passenger door corner component 1 which may be used in a door surrounding of a passenger door in an aircraft, for example in the door surrounding 10 as depicted and explained in conjunction with FIG. 1.

The integral passenger door corner component 1 comprises a substantially cruciform shape having a frame coupling member with two frame couplings 2a, 2b as end pieces, the frame coupling member intersecting with a beam coupling member with two beam couplings 3a, 3b as end pieces. One of the frame couplings 2b and one of the beam couplings 3b form a door edge 4 which may be rounded with a reinforcement rim formed around the inner edge. Opposite of the door edge 4 a corner doubler 5 may be formed with increased corner radius in order to be able to divert force flows away from the joints of the frame couplings 2a, 2b and the beam couplings 3a, 3b. The frame couplings 2a, 2b are employed to connect to the door frames 14, whereas the beam couplings 3a, 3b are employed to connect to the longitudinal beams 15.

Figure 3:
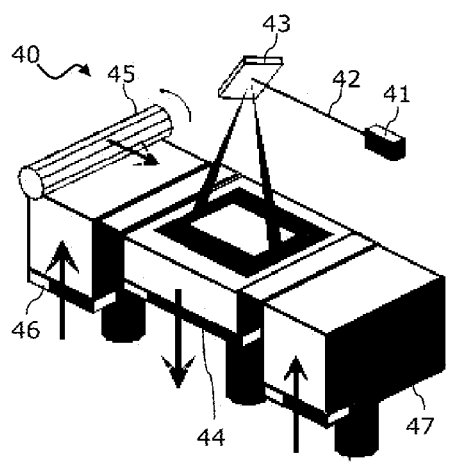
FIG. 3 schematically illustrates an additive layer manufacturing device.
Figure 4:
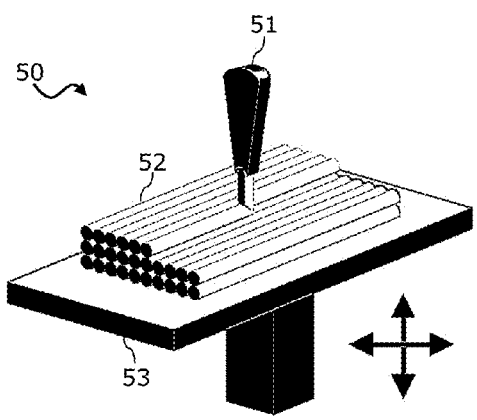
FIG. 4 schematically illustrates a further additive layer manufacturing device.

FIGS. 3 and 4 show schematic illustrations of different repair tool platforms which may be employed in manufacturing an integral passenger door corner component 1 as illustrated in FIG. 2. FIG. 3 shows a powder bed repair station 40 which comprises a laser 41, a deflection device 43, a powder bed container 44 and one or more powder feed cartridges 46, 47. A component to be repaired is placed in the powder bed of the powder bed container 44. The powder feed cartridges 46, 47 hold a basic metal powder substance comprising laser-fusible particles.

The laser 41, for example an infra-red laser, emits a laser beam 42 which is directed by a deflective device 43 including 2D scanning optics onto the powder bed container 44. The laser beam 42 defines a two-dimensional pattern in the thin bed of metal powder. At the impinging positions of the laser beam 42, the metal powder is fused to form a solid layer. Upon completion of a layer, the powder bed container 44 is lowered in vertical direction by some elevation mechanism. The powder bed is then replenished to the original level using a powder feed roller 45 which is moved horizontally in order to convey new powder from the powder feed cartridges 46, 47 and deposit a uniform layer above the previously fused layer. The process of selectively fusing the next layer is then repeated. In this iterative manner, a three-dimensional structure is progressively built up being composed of multiple two-dimensional individual layers the thickness of which is typically on the order of several tens of μm.

Another possible ALM procedure is the wire feed technology as schematically depicted in FIG. 4. A wire feed repair station 50 comprises a wire guiding device 51 which builds up layers of wire 52 onto a build-up table 53. Depending on the length, orientation and segmentation of the wires 20, any desired three-dimensional structure made from a multitude of wire pieces may be progressively built up. The wires 52 are fused together using an electron beam source, a laser source or any other suitable source for selectively coupling melting of fusing heat into the wires 52.

Figure 5:
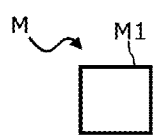
FIG. 5 schematically illustrates a manufacturing method for passenger door corner components of aircraft or spacecraft according to a further embodiment of the invention.

FIG. 5 schematically illustrates a manufacturing method M for passenger door corner components of aircraft or spacecraft. The method M may in particular be employed for manufacturing a passenger door corner component 1 as shown in FIG. 2.

At M1, additive layer manufacturing, ALM, is used to form an integral passenger door corner component 1, the integral passenger door corner component 1 comprising a substantially cruciform shape having a frame coupling member with two frame couplings 2a, 2b as end pieces, the frame coupling member intersecting with a beam coupling member with two beam couplings 3a, 3b as end pieces.

In the foregoing detailed description, various features are grouped together in one or more examples or examples with the purpose of streamlining the disclosure. It is to be understood that the above description is intended to be illustrative, and not restrictive. It is intended to cover all alternatives, modifications and equivalents. Many other examples will be apparent to one skilled in the art upon reviewing the above specification.

The embodiments were chosen and described in order to best explain the principles of the invention and its practical applications, to thereby enable others skilled in the art to best utilize the invention and various embodiments with various modifications as are suited to the particular use contemplated. In the appended claims and throughout the specification, the terms "including" and "in which" are used as the plain-English equivalents of the respective terms "comprising" and "wherein," respectively. Furthermore, "a" or "one" does not exclude a plurality in the present case.

The invention claimed is:

1. A manufacturing method for passenger door corner components of aircraft or spacecraft, the method comprising:

using additive layer manufacturing (ALM) to form an integral passenger door corner component, the integral passenger door corner component comprising a substantially cruciform shape in a longitudinal sectional view having a frame coupling member with first and second frame couplings as end pieces extending in a first direction, the frame coupling member intersecting with a beam coupling member with first and second beam couplings as end pieces extending in a second direction substantially perpendicular to the first direction, wherein one of the frame couplings and one of the beam couplings form a door edge which is rounded with a reinforcement rim formed around the inner edge, said reinforcement rim being integrally formed with the passenger door corner component and substantially extending in a longitudinal sectional plane of the passenger door corner component.

2. The method according to claim 1, wherein ALM is performed using powder bed technology.

3. The method according to claim 1, wherein ALM is performed using wire feed technology.

4. The method according to claim 1, wherein the integral passenger door corner component comprises a corner doubler in an angle opposite of the door edge.

5. An integral passenger door corner component manufactured by a method comprising:

using additive layer manufacturing (ALM) to form an integral passenger door corner component, the integral passenger door corner component comprising a substantially cruciform shape in a longitudinal sectional view having a frame coupling member with first and second frame couplings as end pieces extending in a first direction, the frame coupling member intersecting with a beam coupling member with first and second beam couplings as end pieces extending in a second direction substantially perpendicular to the first direction, wherein one of the frame couplings and one of the beam couplings form a door edge which is rounded with a reinforcement rim formed around the inner edge, said reinforcement rim being integrally formed with the passenger door corner component and substantially extending in a longitudinal sectional plane of the passenger door corner component.

* * * * *